United States Patent [19]

Elsbree, Jr. et al.

[11] Patent Number: 4,598,471

[45] Date of Patent: Jul. 8, 1986

[54] PIN INSERTER FOR ELECTRONIC BOARDS

[75] Inventors: Charles N. Elsbree, Jr., Cupertino, Calif.; Werner Kuhne, Pagosa Springs, Colo.

[73] Assignee: Symtron Corporation, Mountain View, Calif.

[21] Appl. No.: 693,697

[22] Filed: Jan. 22, 1985

[51] Int. Cl.[4] .......................... H01R 9/14; B23P 23/00

[52] U.S. Cl. ...................................... 29/845; 29/564.6; 29/747

[58] Field of Search .............. 29/845, 747, 739, 564.6, 29/564.1, 759, 760

[56] References Cited

U.S. PATENT DOCUMENTS 4,216,580 8/1980 Chisholm .......................... 29/747 X
4,365,398 12/1982 Chisholm .............................. 29/845
4,398,628 8/1983 Chisholm .......................... 29/845 X
4,503,610 3/1985 Resch .................................... 29/845

*Primary Examiner*—Howard N. Goldberg
*Assistant Examiner*—Carl J. Arbes
*Attorney, Agent, or Firm*—Townsend and Townsend

[57] ABSTRACT

The present invention is an improved machine for inserting a plurality of pins from a continuous webbing of pins into a motherboard. The machine has a pair of plier-like jaws with interior confronting surfaces for grasping and holding the pins when the jaws are closed. The two jaws, which extend downward, are separated from each other above the confronting surfaces to provide an opening through the jaws. The continuous webbing is fed through this opening with the pins extending down between the confronting surfaces of the jaws. When the desired number of pins are between the jaws, the jaws close to grasp the pins and the carrier strip is then separated from the pins. The jaws are then moved downward to insert the pins into the motherboard with the opening preventing interference with the carrier strip.

16 Claims, 16 Drawing Figures

PIN INSERTER FOR ELECTRONIC BOARDS

BACKGROUND OF THE INVENTION

This invention relates to a machine for inserting pins into circuit boards.

Many computers and other electronic devices use a back panel, or motherboard, in a cabinet with a series of connectors into which individual circuit boards are inserted. The connectors are composed of parallel rows of metal pins which provide both a structural connection and an electrical connection between the motherboard and the circuit boards. The connectors are formed by inserting the pins into holes in the motherboard. The holes in the motherboard are typically plated with a metal to form an electrical connection, or the ends of the pins may be wire-wrapped to form electrical connections.

The individual pins typically have a widened shoulder portion near the middle which stops the pin from being pushed completely through the motherboard and also provides a surface for pushing against the pin to insert it into the motherboard. The pins are typically made by punching them out of a metal strip giving a comb-like structure with the pins connected at one end by a carrier strip to form a webbing. This webbing may either be continuous or may form a short 'comb' with a fixed number of pins.

A comb webbing can be grasped with a special pair of jaws and hand-inserted into the motherboard. Shultz, Jr. et al., U.S. Pat. No. 3,875,636, shows such a pair of jaws. Care must be taken to insert the pins without bending them or damaging the sides of the holes in the motherboard which are coated with a metallic layer to provide an electrical connection. After the pins have been inserted, the webbing can be bent to break the pins free and the pins can then be aligned by tapping the pins with a ruler-like device between adjacent rows of pins or by similar means. These steps must be done carefully to avoid excessive damage to the holes in the motherboard.

Automatic pin inserting machines which insert one pin at a time into the motherboard also exist. There are, however, obvious limitations in the speed of such a machine. Machines which insert more than one pin at a time use a pair of jaws to grasp the comb of pins. Such a pair of jaws would have slots on its interior surface to accommodate the pins, such as shown by Cobaugh et al. in U.S. Pat. No. 3,946,477.

In order to prevent misalignment of the pins and avoid damage to the holes and circuits of the motherboard, it is desirable to separate the pins from the carrier strip before insertion. This can be done by grasping the webbed pins with a pair of jaws and then removing the carrier strip with a punch, such as shown by Chisholm in U.S. Pat. No. 4,216,580. The Chisholm device shows a comb of pins being inserted into the jaws and a punch attached to one jaw severs the pins from the carrier strip as the jaws are closed. The jaws could then be used to insert the pins in the motherboard. Chisholm also shows the comb of pins being connected at their bottom end as well as their top end and the carrier strip on the bottom end being removed by enclosing the carrier strip in a channel which is rocked back and forth to bend the carrier strip and break the carrier strip from the pins. In order to thereafter insert the pins in the motherboard, the channel would have to be removed from beneath the jaws.

In order to increase the speed of a pin inserting machine, one can use a continuous webbing which is wound on two reels like a movie film. Such a method of using a continuous webbing is shown in Chisholm, U.S. Pat. No. 4,265,508. The continuous webbing of pins is fed through a first position where the pins are grasped by a clamping mechanism and the carrier strip is severed from the pins by a punch and die operation. The clamping mechanism, which is located on a turret, is then rotated 90 degrees to place the pins directly above the motherboard. The clamping mechanism is then lowered to insert the pins into the motherboard. The use of the turret allows the clamping mechanism to be rotated away from the carrier strip so that the clamping mechanism can be lowered to insert the pins without interference from the carrier strip. Unfortunately, the turret adds complexity and more moving parts, which have to be aligned, to the machine.

SUMMARY OF THE INVENTION

The present invention is an improved machine for inserting a plurality of pins from a continuous webbing of pins into a motherboard. The machine has a pair of plier-like jaws with interior confronting surfaces for grasping and holding the pins when the jaws are closed. The two jaws, which extend downward, are separated from each other above the confronting surfaces to provide an opening through the jaws. The continuous webbing is fed through this opening with the pins extending down between the confronting surfaces of the jaws. When the desired number of pins are between the jaws, the jaws close to grasp the pins and the carrier strip is then separated from the pins. The jaws are then moved downward to insert the pins into the motherboard with the opening preventing interference with the carrier strip.

The present invention eliminates the necessity for separating the pins from the carrier strip at one position and then moving the pins to another position for insertion. This produces the corollary benefits of increasing the speed of the machine and improving the alignment of the pins by eliminating the step of transporting the pins to a second position. Preferably, the pins are removed from the carrier strip by bending the webbing. This is done by including a rod extending through the opening between the jaws with a lengthwise slot in the bottom of the rod to accommodate the carrier strip. The rod is rotated back and forth while the pins are firmly grasped by the jaws to bend the webbing and break the carrier strip away from the pins. Alternately, a punch-and-die mechanism without the opening between the jaws could be used.

The jaws for grasping the pins have one jaw with an interior confronting surface having a shape complementary to the pins. Preferably, the pins have an elongate contact portion attached to the webbing at a breaking point portion. Below the contact portion is a widened shoulder having upper and lower surfaces and below the shoulder is an elongate wire wrap portion of the pin. One of the jaws has slots complementary to the contact portion of the pin and a series of ribs in between the slots to engage the upper surface of the shoulders on the pins for pushing the pins into the motherboard. The confronting surface of the other jaw has a thin resilient strip attached for pressing the pins into the slots of the other jaw when the jaws are closed. The jaws also have slots on their exterior surfaces so that adjacent rows of already-inserted pins on the circuit board will not be disturbed by the jaws when inserting a new row. This is because the adjacent pins will be able to slide within such exterior slots. These exterior slots can also serve to further align already-inserted pins.

The machine of the present invention has a support surface for holding a motherboard. The support surface can be moved in either direction along X and Y axes. Below the motherboard is located a backup bar having a series of slots for seating the pins inserted through the motherboard. When the motherboard is positioned, an alignment pin on the backup bar is raised to engage one of the holes in the motherboard and thereby align the backup bar below the row of holes on the motherboard into which pins are to be inserted. The webbing of pins fed through the jaws passes across a counter wheel which engages holes in the carrier strip portion of the webbing and produces a count of the pins. The webbing also passes photodiode sensors which detect when the pins are out of alignment. The entire machine is controlled by a processor which can be programmed for different motherboard types and differing numbers of pins in each row.

The processor directs the alignment of the motherboard and the backup bar. The correct number of pins are counted and moved into the space between the jaws. The jaws are then raised in an open position and clamped onto the pins. The rod is rotated to sever the pins from the carrier strip and the jaws are moved downward so that the pins pass through the holes in the motherboard and into the slots of the backup bar. After the pins are seated, the jaws open slightly so that adjacent rows of pins are not disturbed, and are raised above the height of the pins. At the same time, the next series of pins are being moved into the opening between the jaws. The jaws are then fully opened and raised up to grasp the next set of pins and thereafter the process is repeated.

DETAILED DESCRIPTION OF THE PREFERRED EMBODIMENT

Figure 1:
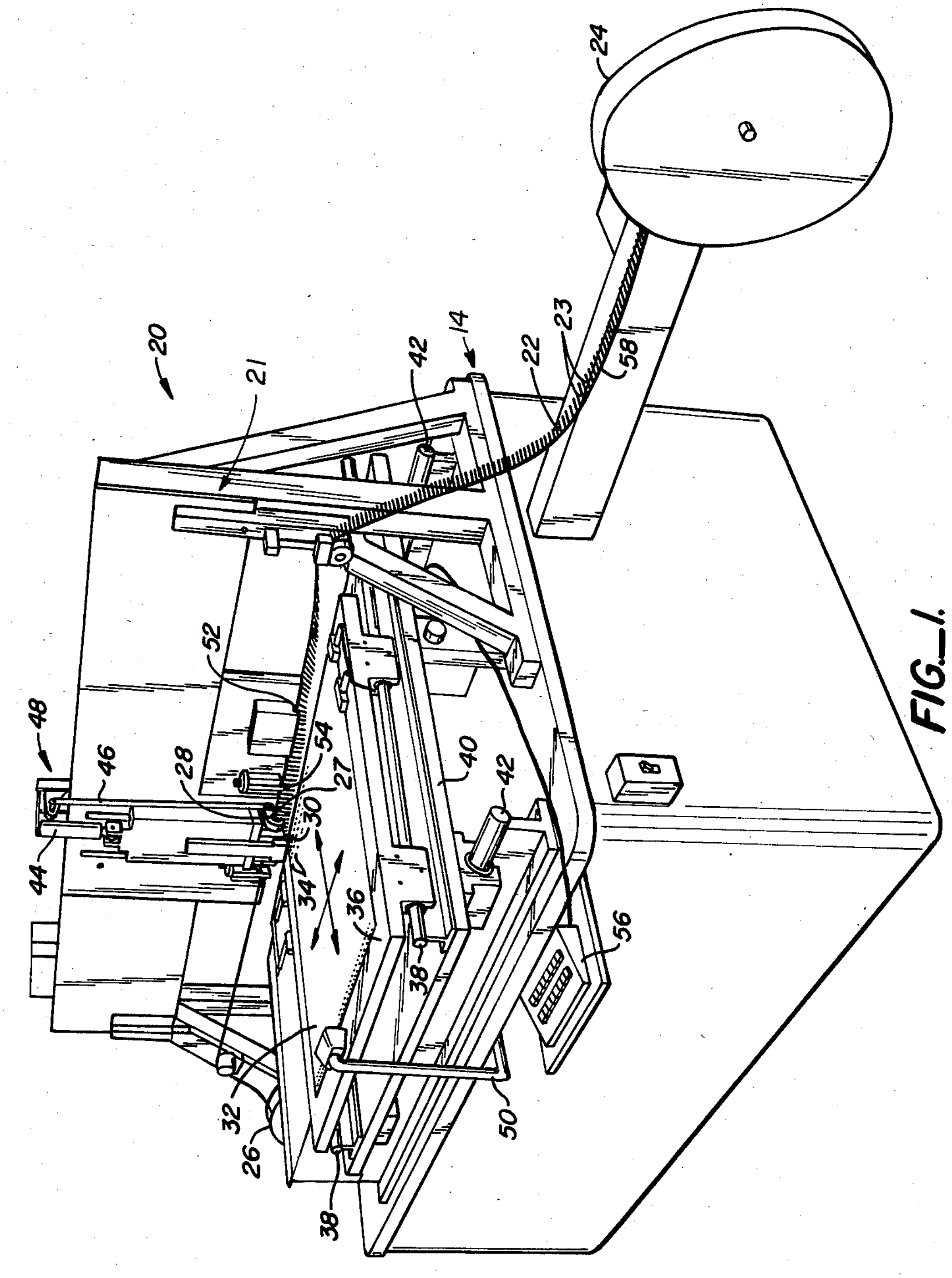
FIG. 1 is a perspective view of the preferred embodiment of the invention.

FIG. 1 shows the pin inserting machine 20 of the present invention. Apparatus 20 includes a table 14 supporting a frame 21. A continuous webbing 22 of pins 23 is fed from a reel 24 to a take-up reel 26. Webbing 22 passes through a slot 27 in a rod 28 and between a pair of jaws 30. A subject motherboard 32 has rows of holes 34 into which pins 23 are to be inserted. Motherboard 32 is mounted on a platform 36 which is in turn mounted on rods 38 to allow movement in one direction. Platform 36 and rods 38 are in turn mounted on a platform 40 which is connected to rods 42 to allow movement in a perpendicular direction.

Jaws 30 and rod 28 are connected via shaft mechanisms 44 and 46, respectively, to a motor and camshaft mechanism 48. A lamp 50 provides light to a series of photosensors 52 for determining the alignment of pins 23 in webbing 22. A counter wheel 54 engages holes in webbing 22 to count the number of pins 23.

A processor 56 controls the operation of pin inserting machine 20. Webbing 22 is fed between jaws 30 and through a slot 27 in rod 28 until counter 54 determines that the correct number of pins have been moved. Jaws 30 then grasp the pins and rod 28 is rotated by motor and camshaft mechanism 46 and shaft 48 to break the carrier strip portion 58 of webbing 22 from pins 23. Motor 46 and shaft 44 then move jaws 30 downward to insert the pins into holes 34 of motherboard 32.

Figure 2:
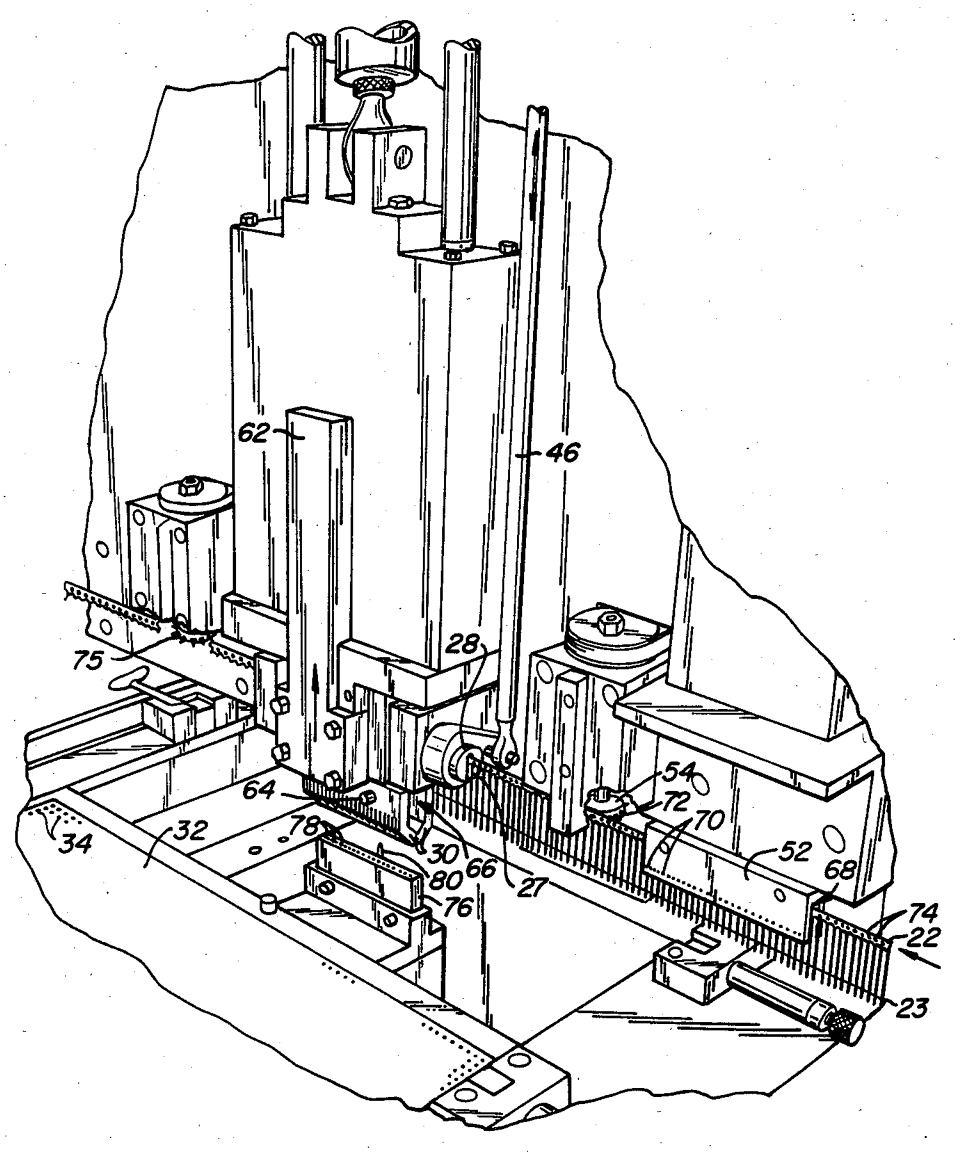
FIG. 2 is an enlarged perspective view of the center portion of the machine of FIG. 1.

The center portion of pin inserting machine 20 is shown in more detail in FIG. 2. Jaws 30 are coupled to a driving mechanism 62 by nuts 64. Jaws 30 are biased to a closed position by a spring (not shown). Jaws 30 define an opening 66 between them through which webbing 22 can pass. Rod 28, shown in more detail in FIG. 5, passes through opening 66.

Photosensor 52 defines a slot 68 through which webbing 22 can pass. A series of holes 70 allow light from lamp 50 of FIG. 1 to pass through slot 68. If the light passing through a hole 70 is blocked by a pin 23, no light will reach a photodiode (not shown) on the side of slot 68 opposite hole 70. If the light from all of holes 70 is blocked, this indicates that pins 23 are in alignment. If a pin 23 is out of alignment, processor 58 will cause pin inserting machine 20 to stop until the alignment is corrected.

Counter wheel 54 has a series of spokes 72 which engage holes 74 in webbing 22. This enables a precise count of pins 23 passing between jaws 30. Counter wheel 54 and an additional wheel 75 serve to advance webbing 22.

A backup bar 76 is located beneath jaws 30 and beneath motherboard 32. Backup bar 76 has a series of slots 78 for receiving pins 23. An alignment pin 80 is also provided to engage one of holes 34 in motherboard 32 for aligning backup bar 76. Backup bar 76 can be moved up and down under the control of processor 56 to allow motherboard 32 to be moved to receive the next group of pins 23. Alignment pin 80 can also be moved up and down under control of processor 56.

Figure 3:
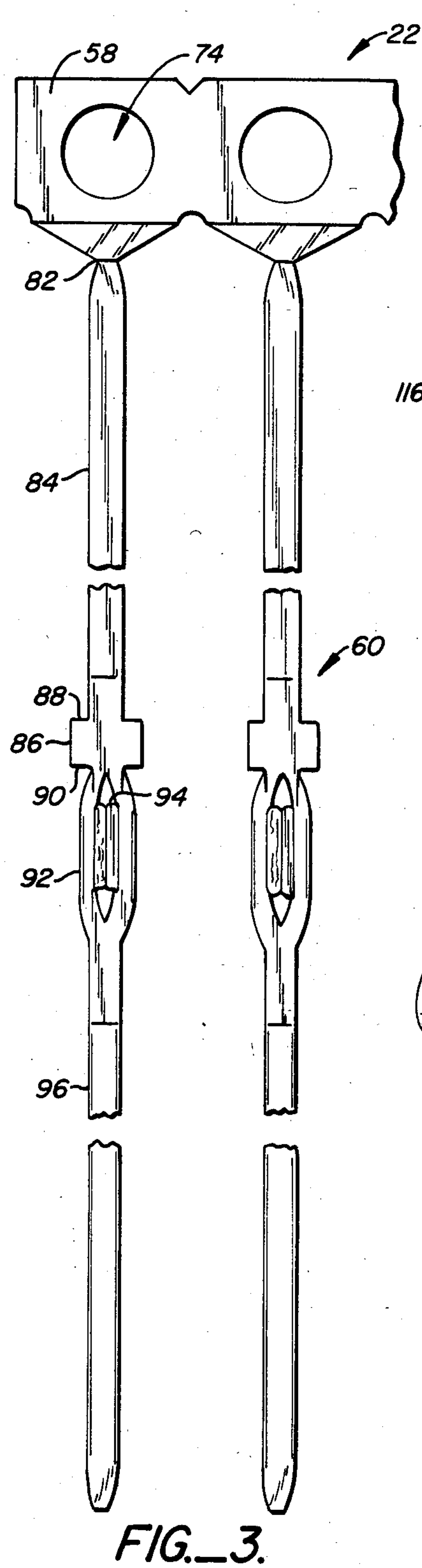
FIG. 3 is an enlarged plan view of the pins used in the present invention.

FIG. 3 shows the detail of pins 23 of webbing 22. The carrier strip 58 has a series of holes 74 to facilitate conveying webbing 22. Carrier strips 58 is connected to pins 23 at a narrow breaking point 82. Breaking point 82 is connected to a contact portion 84. Contact portion 84 is connected to a shoulder 86 having an upper surface 88 and a lower surface 90. Shoulder 86 is coupled to a widened portion 92 defining a slot 94. Upon insertion into a hole 34 in motherboard 32, widened portion 92 will compress, forming a snug connection to a hole 34. Beneath contact portion 92 is a wire wrap portion 96. Wire wrap portion 96 can be used for wrapping a wire around pin 23 after insertion into motherboard 32 as an alternate method of providing electrical connection between pins.

Figure 4A:
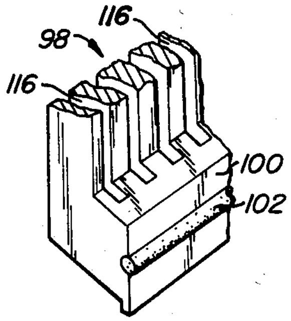
FIGS. 4A–4B are enlarged perspective views of the jaws of the machine of FIG. 1.
Figure 4B:
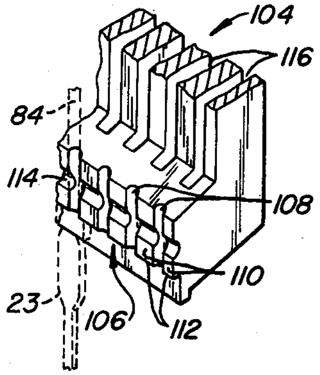

FIGS. 4A and 4B show the detail of jaws 30. In FIG. 4A, a first jaw 98 has a confronting surface 100 having a thin, rounded resilient strip 102. Opposing jaw 104 in FIG. 4B has a confronting surface 106 having a series of slots 108 shaped to receive the contact portion 84 of pins 23. A series of ribs 110 are located between the slots 108. A lower portion 112 of ribs 110 is provided to engage upper surface 88 of shoulder 86 of pins 23. A lengthwise slot 114 is provided to accommodate resilient strip 102. A series of slots 116 on the exterior surface of both jaw 104 of FIG. 4B and jaw 98 of FIG. 4A are provided to accommodate adjacent rows of pins already inserted on motherboard 32. Slots 108 and 116 are on 0.1 inch spacings, as are pins 23 in webbing 22. In the preferred embodiment, there are 32 slots 108 in jaw 104. Alternatively, up to approximately 50 slots could be used. If more than 50 pins are inserted at once, the dimensions of the motherboard are changed sufficiently during insertion to require appropriate adjustment.

Figure 5:
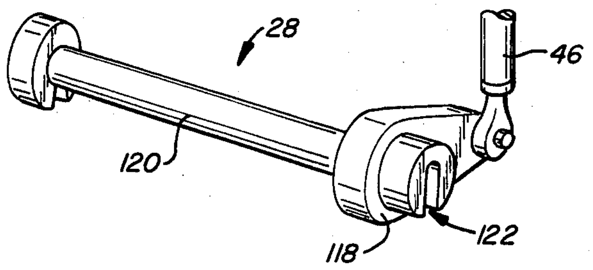
FIG. 5 is a perspective view of the rotating rod of the machine of FIG. 1.

FIG. 5 shows rod 28. Shaft 46 is coupled to a member 118 which is connected to the internal portion 120 of rod 28. Slot 27 runs lengthwise through rod 28. Internal portion 120 is thin enough to fit within opening 66 between jaws 30 as shown in FIG. 2. Slot 27 is wide enough to engage carrier strip portion 58 of webbing 22.

Figure 6:
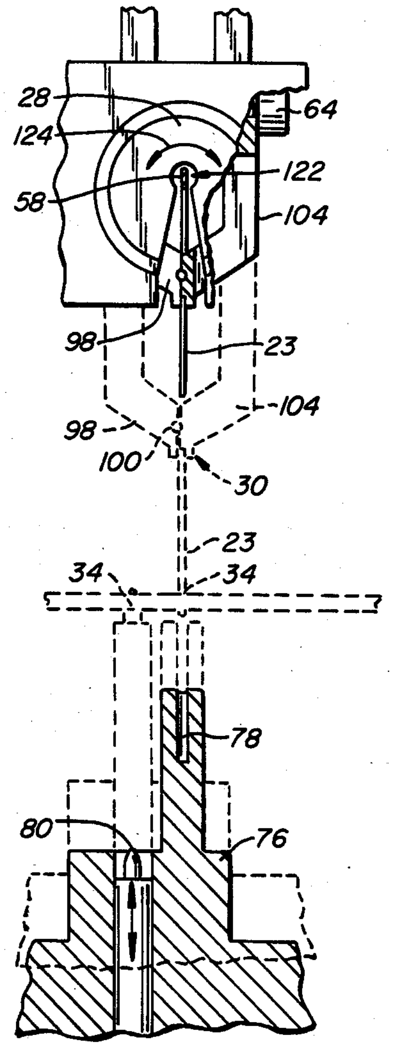
FIG. 6 is a side plan view of the jaws and backup bar of the machine of FIG. 1.

FIG. 6 shows a side view of jaws 30 and backup bar 76. Jaws 30 and backup bar 76 are shown in phantom in the positions they occupy when pins 23 are being inserted into motherboard 32. As can be seen in FIG. 6, a pin 23 is grasped between jaws 98 and 104 and held with resilient strip 102 pressing against the pin. Rod 28 is rotated as indicated by arrows 124 to break pins 23 away from carrier strip 58. Jaws 30 are then lowered to insert pins 23 into holes 34 in motherboard 32. The wire wrap portion of pin 23 passes through motherboard 32 and is seated in a slot 78 of backup bar 76. Prior to insertion, alignment pin 80 can be moved upward to engage a hole 34 in motherboard 32 to align the position of backup bar 76.

Figure 11:
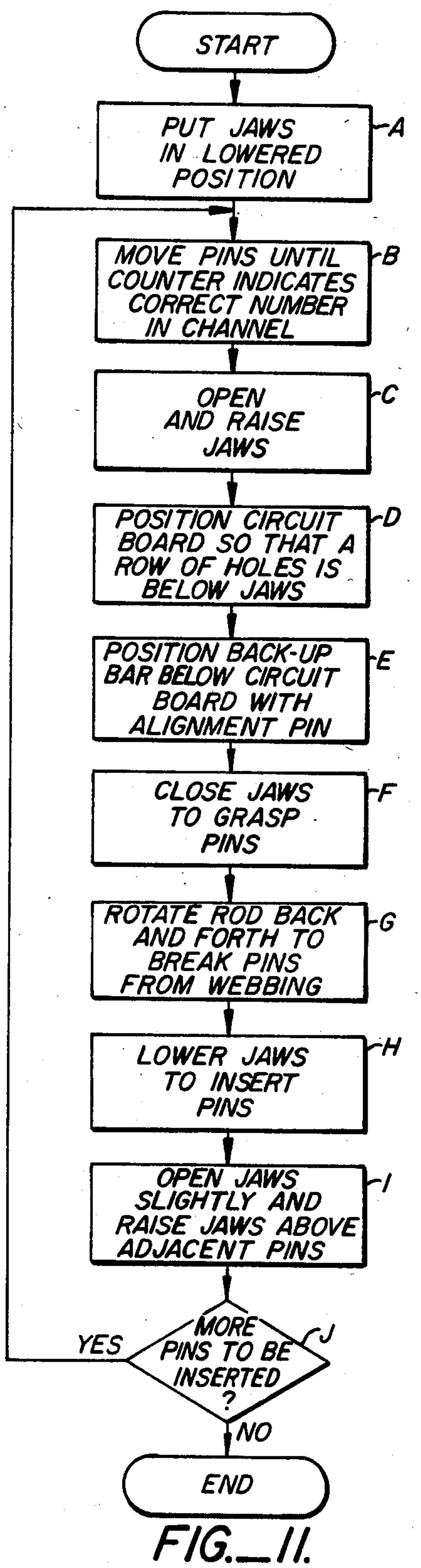
FIG. 11 is a flow chart of the operation of the machine of FIG. 1.
Figure 7:
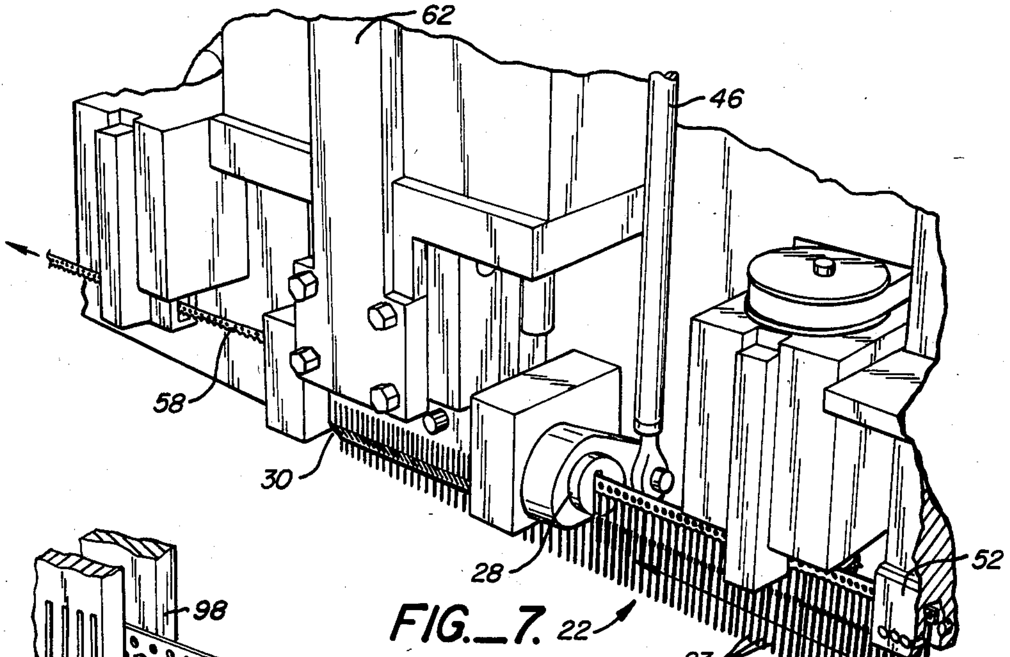
FIGS. 7–10A are enlarged perspective views of the jaws of the machine of FIG. 1 showing different steps in the operation of the machine.
Figure 7A:
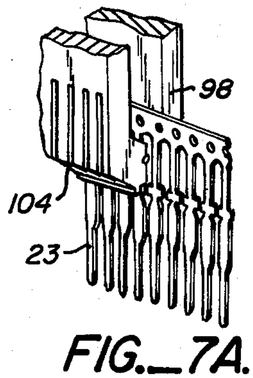
Figure 8:
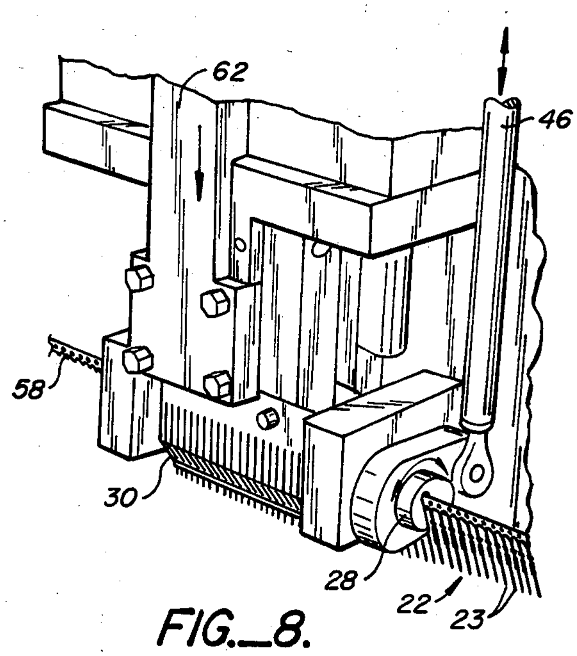
Figure 8A:
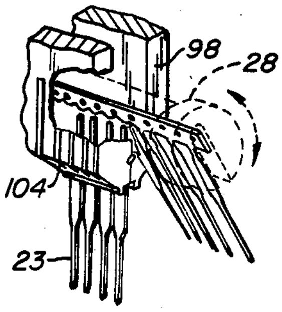
Figure 9:
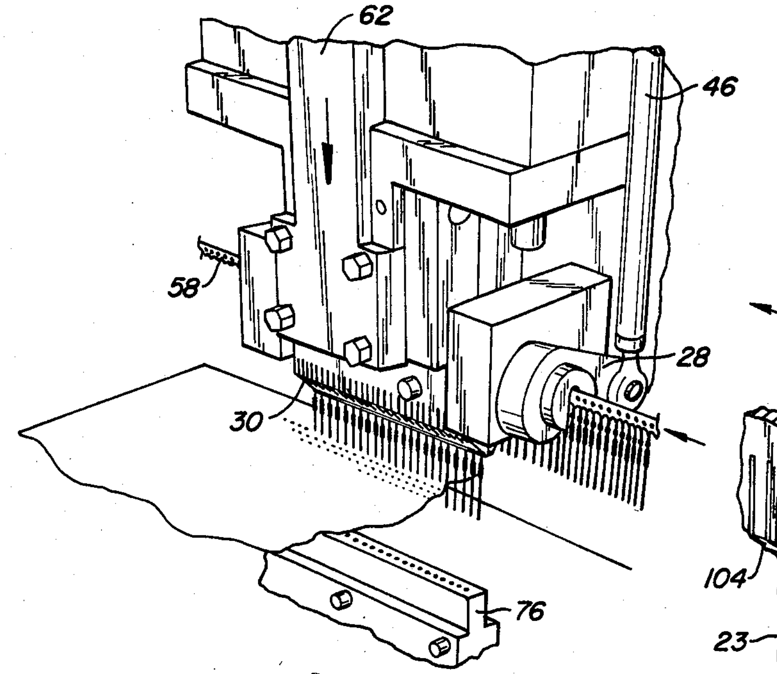
Figure 9A:
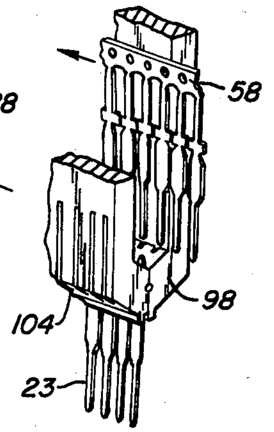
Figure 10:
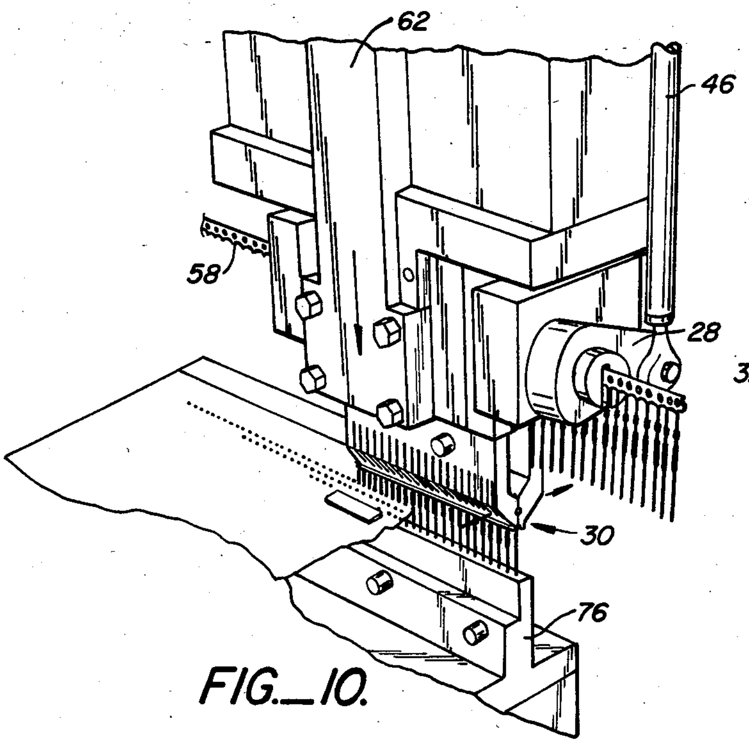
Figure 10A:
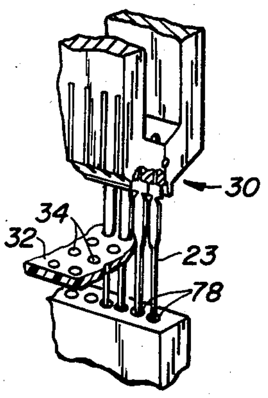

The operation of pin-inserting machine 20 can be seen by reference to FIGS. 7–10A and the flow chart of FIG. 11. Jaws 30 are originally placed in the lowered position shown in FIG. 2 (step A). Pins 23 are then moved into opening 66 between jaws 30 by wheels 54, 75 until counter wheel 54 indicates that the correct number have passed (step B). Jaws 30 are opened and raised into their upper position (step C). Motherboard 32 is then positioned so that a row of holes 34 is beneath jaws 30 (Step D). Backup bar 76 is then positioned using alignment pin 80 so that slots 78 are directly beneath the row of holes 34 into which pins 23 will be inserted (Step E). Jaws 30 are then closed to grasp pins 23 as shown in FIGS. 7 and 7A (Step F). Rod 28 is then rotated to twist webbing 22 and break pins 23 off of carrier strip 58 as shown in FIGS. 8 and 8A (Step G). As can be seen, the entire webbing 22, except for the pins 23 being held by jaws 30, will rotate. Jaws 30 are then lowered to insert pins 23 into motherboard 32 as shown in FIG. 9 (Step H). As jaws 30 are lowering, webbing 22 is advanced to move a new set of pins 23 into opening 66 as soon as there is sufficient clearance between the webbing and the jaws, as shown in FIG. 9A. This provides a set of pins 23 for the next row of holes 34 in motherboard 32. As shown in FIGS. 10 and 10A, pins 23 as held by jaws 30 are passed through holes 34 and motherboard 32 and into slots 78 of alignment bar 76. When pins 23 are seated, jaws 30 will open slightly and be raised to a height above the inserted pins 23 (Step I). If more pins are to be inserted (Step J) jaws 30 will then open completely and the process will be repeated.

As will be understood by those familiar with the art, the present invention may be embodied in other specific forms without departing from the spirit or essential characteristics thereof. Accordingly, a disclosure of the preferred embodiment of the present is intended to be illustrative, but not limiting, of the scope of the invention which is set forth in the following claims.

What is claimed is:

1. A method for inserting pins into holes in a circuit board, said pins being joined at one end by a narrow breaking point portion to a carrier strip to form a continuous webbing and having a lower portion for insertion to a circuit board, and a medial portion for protrusion above said circuit board, said method comprising the steps of:

(a) providing a breaker bar with a channel for receiving said carrier strip;

(b) conveying said webbing past a position above and proximate said holes in said circuit board with said carrier strip in said channel of said breaker bar;

(c) providing a pair of confronting jaws for grasping a plurality of pins once confronted, said jaws disposing lower end of said pins for insertion to said board, said jaws grasping said pins at a medial portion thereof and said jaws defining an opening above said confronted jaws for said carrier strip within said channel of said breaker bar;

(d) confronting said jaws to grasp a group of said pins and holding said pins motionless;

(e) rotating said breaker bar with said carrier strip in said channel relative to said confronted jaws and pins to bend and break said webbing at said breaking points thereby separating said grasped pins from said carrier strip;

(f) inserting said grasped pins into said holes in said circuit board; and (g) repeating steps (a)–(e) for a next group of pins.

2. The method of claim 1, wherein said inserting step includes:

moving said jaws toward said circuit board until said group of pins extend through said row of holes;

separating said jaws a distance sufficient to release said pins without disturbing pins inserted in an adjacent row; and moving said jaws away from said circuit board.

3. An apparatus for inserting a row of pins into a row of holes in a table supported circuit board, said pins being joined at an upper end to a carrier strip to form a continuous webbing from said carrier strip and pins, said pins each having a lower portion for insertion to said circuit board and a medial portion for protrusion above said circuit board when inserted therein, said apparatus for inserting comprising:

a pair of jaws supported from a frame, said frame supported from said table, over said circuit board, each jaw having confronting surface for grasping said row of pins at said medial portion, said jaws when confronted defining an opening to allow said carrier strip to protrude from said pins into said opening in said jaws with said lower portions of said pins protruding below said jaws for insertion into said circuit board;

at least one of said jaws defining a plurality of indentations, each said defined indentation for receiving one of said pins at said medial portion;

a breaker bar having a defined slit for receiving said carrier strip, said breaker bar supported from said frame and extending through said opening in said jaws;

means for conveying said carrier strip and pins through said opening in said jaws to register at least one of said pins with one of said indentations, said means for conveying operatively associated with said breaker bar;

means for moving said jaws to and from a confronting relation over said pins while said slot in said breaker bar has said carrier strip contained therein, said means for moving said jaws operatively associated with said frame;

means for relatively rotating said breaker bar with respect to said jaws when closed to sever said pins in said jaws from said carrier strip and leave said severed pins in said jaws, said means for relatively rotating said breaker bar supported from said frame; and means for moving said jaws towards and away from said circuit board supported from said frame with said pins therein to and toward said holes in said circuit board whereby the lower portion of said pins protruding from said jaws is inserted into said holes in said circuit board.

4. The apparatus of claim 3 wherein said one of said jaws includes a resilient strip disposed thereon for holding said pins in said slots of said first jaw.

5. The apparatus of claim 3 wherein each of said jaws includes an exterior surface opposite said confronting surface, said exterior surface defining a plurality of slots to accommodate pins inserted into rows of holes in said circuit board adjacent said first mentioned row.

6. The apparatus of claim 3 further comprising means for moving support of said circuit board supported from said table, said support means being capable of planar movement to position said row of holes beneath said jaws.

7. The apparatus of claim 3 further comprising an alignment bar supported from said table and disposed beneath said jaws and defining a plurality of slots for receiving and aligning an end of said pins after said pins have been inserted through said row of holes in said circuit board.

8. The apparatus of claim 3 wherein said alignment bar includes a pin for engaging one of said holes in said circuit board to orient said alignment bar relative to said circuit board.

9. The apparatus of claim 3 further comprising:

a counter supported from said frame and operatively associated with said conveying means to produce a count of the number of pins conveying between said jaws;

a processor communicated to said counter for monitoring said count and controlling the operation of said conveying means; and a memory being programmable to control the conveyed number of pins to correspond to holes in said circuit board under said jaws.

10. Apparatus for inserting a roll of pins into a row of holes in a circuit board supported on said apparatus, said apparatus comprising:

a continuous webbing of pins being supported from said apparatus, said webbing of pins being joined at an upper end to a carrier strip to form a continuous webbing from said carrier strip and pins, said pins each having a lower portion for insertion to said circuit board and a medial portion for protrusion above said circuit board when inserted therein;

a pair of jaws supported from said apparatus, each jaw having a confronting surface for grasping said row of pins at a medial portion, said jaws when confronted defining an opening to allow said carrier strip to protrude from said pins into said opening in said jaws with said lower portion of said pins protruding below said jaws for insertion into said circuit board;

at least one of said jaws defining a plurality of indentations, each said defined indentation for receiving one of said pins at said medial portion;

a breaker bar supported from said apparatus between said jaws having a defined slit for receiving said carrier strip, said breaker bar extending through said opening in said jaws;

means for conveying said carrier strip through said defined slit in said breaker bar supported from said apparatus with said pins extending through said opening in said jaws to register at least one of said pins with one of said indentations in said jaws;

means for moving said jaws to and from a confronting relationship over said pins said means for moving supported from said apparatus and operatively associated with said conveying means while said slot in said breaker bar has said carrier strip contained therein;

means for relatively rotating said breaker bar with respect to said jaws to sever said pins in said jaws from said carrier strip and to leave said severed pins in said jaws, said means for relatively rotating supported from said apparatus and operatively associated with said means for moving said jaws; and means for moving said jaws to and from said circuit board with said pins therein to and toward said holes in said circuit board whereby the lower portion of said pins protruding from said jaws inserted into said holes in said circuit board, said means for moving said jaws to and from said circuit board supported from said apparatus.

11. The apparatus of claim 10 wherein one of said jaws includes a resilient strip for holding said pins in said slots of said first jaw.

12. The apparatus of claim 10 wherein each of said jaws includes an exterior surface opposite said confronting surface, said exterior surface defining a plurality of slots to accommodate pins inserted into rows of holes in said circuit board adjacent said first mentioned row.

13. The apparatus of claim 10 further comprising means for moving support of said circuit board supported from said table, said support means being capable of planar movement to position said row of holes beneath said jaws.

14. The apparatus of claim 10 further comprising an alignment bar supported from table and disposed beneath said jaws and defining a plurality of slots for receiving and aligning an end of said pins after said pins have been inserted through said row of holes in said circuit board.

15. The apparatus of claim 10 wherein said alignment bar includes a pin for engaging one of said holes in said circuit board to orient said alignment bar relative to said circuit board.

16. The apparatus of claim 10 further comprising:

a counter supported from said frame and operatively associated with said conveying means to produce a count of the number of pins conveyed between said jaws;

a processor communicated to said counter for monitoring said count and controlling the operation of said conveying means; and a memory being programmable to control the conveyed number of pins to correspond to holes in said circuit board under said jaws.

* * * * *